US010454856B2

(12) United States Patent
Tao et al.

(10) Patent No.: US 10,454,856 B2
(45) Date of Patent: Oct. 22, 2019

(54) INSTANT MESSAGE PROCESSING METHOD, APPARATUS, AND SYSTEM

(71) Applicant: Tencent Technology (Shenzhen) Company Limited, Shenzhen, Guangdong (CN)

(72) Inventors: Xuecheng Tao, Guangdong (CN); Jian Dong, Guangdong (CN); Xuewei Fang, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 188 days.

(21) Appl. No.: 15/299,174

(22) Filed: Oct. 20, 2016

(65) Prior Publication Data

US 2017/0041259 A1 Feb. 9, 2017

Related U.S. Application Data

(63) Continuation of application No. PCT/CN2015/077040, filed on Apr. 21, 2015.

(30) Foreign Application Priority Data

Apr. 22, 2014 (CN) .......................... 2014 1 0161636

(51) Int. Cl.
*G06F 15/16* (2006.01)
*H04L 12/58* (2006.01)
*H04W 4/12* (2009.01)

(52) U.S. Cl.
CPC ............ *H04L 51/046* (2013.01); *H04L 51/04* (2013.01); *H04L 51/38* (2013.01); *H04W 4/12* (2013.01)

(58) Field of Classification Search
CPC ......... H04L 51/04; H04L 51/38; H04L 51/00; H04L 67/306; H04L 51/14; H04L 51/36; H04W 4/14
See application file for complete search history.

(56) References Cited

U.S. PATENT DOCUMENTS 7,921,163 B1 * 4/2011 Odell ...................... H04L 51/14
709/206
8,201,247 B1 * 6/2012 Chen ...................... G06F 21/564
726/22

(Continued)

FOREIGN PATENT DOCUMENTS

CN 1633115 A 6/2005
CN 100586113 C 1/2010

(Continued)

OTHER PUBLICATIONS

International Search Report and Written Opinion received in PCT Application No. PCT/CN2015/077040 dated Jun. 3, 2015.

*Primary Examiner* — Liang Che A Wang
*Assistant Examiner* — Ayele F Woldemariam
(74) *Attorney, Agent, or Firm* — Brinks Gilson & Lione

(57) ABSTRACT

An instant message processing method includes: acquiring, by a first terminal by using a first application program, an instant message input by a user, generating a first processing request according to the instant message, and sending the first processing request to a server; processing, by the server, the first processing request, and sending the instant message to the second terminal according to a second identity; and displaying, by the second terminal, the received instant message by using a second application program, or displaying, by the second terminal, the received instant message by using the first application program and the second application program. Besides, the present disclosure further provides an instant message processing apparatus and system.

(Continued)

With the instant message processing method, apparatus, and system, an instant message can be transferred between different application programs, thereby improving the efficiency of instant message processing.

17 Claims, 10 Drawing Sheets

(56) References Cited

U.S. PATENT DOCUMENTS

| | | | |
|---|---|---|---|
| 8,407,726 B2* | 3/2013 | Jha | G06F 9/542 |
| | | | 715/751 |
| 2005/0044144 A1* | 2/2005 | Malik | H04L 51/04 |
| | | | 709/205 |
| 2005/0210113 A1 | 9/2005 | Kasuga et al. | |
| 2009/0150499 A1* | 6/2009 | Partridge | G06Q 10/107 |
| | | | 709/206 |
| 2011/0040838 A1* | 2/2011 | Damarla | H04L 51/38 |
| | | | 709/206 |
| 2014/0208095 A1* | 7/2014 | Stuntebeck | H04L 63/06 |
| | | | 713/152 |

FOREIGN PATENT DOCUMENTS

| | | |
|---|---|---|
| CN | 102202015 A | 9/2011 |
| CN | 103227788 A | 7/2013 |
| CN | 103973545 A | 8/2014 |
| WO | WO 2010/075741 A1 | 7/2010 |
| WO | WO 2015/161773 A1 | 10/2015 |

* cited by examiner

INSTANT MESSAGE PROCESSING METHOD, APPARATUS, AND SYSTEM

CROSS REFERENCE OF RELATED APPLICATIONS

This application is a continuation of International Application No. PCT/CN2015/077040, filed on Apr. 21, 2015, which claims the priority to Chinese Patent Application No. 201410161636.4, filed on Apr. 22, 2014, both of which are hereby incorporated by reference in their entireties.

FIELD OF THE TECHNOLOGY

The present disclosure relates to computer technologies, and in particular, to an instant message processing method, apparatus, and system.

BACKGROUND OP THE DISCLOSURE

With the development of computers and network technologies, more and more people start to communicate by sending an instant message in a network. However, in the existing technology, an instant message can be transferred only between same instant messaging client programs, but cannot be transferred between different programs. For example, when a user sends one instant message to a menu by using Tencent QQ, the friend of the user can receive the instant message only after logging in to the instant messaging client program, that is, Tencent QQ. In the existing technology, it is impossible for the user to send one instant message by using Tencent QQ to Feixin or another client program (for example, a game) having an instant messaging function. Therefore, the existing technology limits the transfer scope of the instant message, and has low efficiency of instant message processing.

SUMMARY

In view of this, the present disclosure provides an instant message processing method, apparatus, and system, so that an instant message can be transferred between different application programs thereby improving the efficiency of instant message processing.

An embodiment of the present invention provides an instant message processing method, including: acquiring, by a first terminal by using a first application program, an instant message input by a user, generating a first processing request according to the instant message, and sending the first processing request to a server, the first processing request being used for requesting the server to send the instant message to a second terminal, the first processing request including: the instant message, a first user account, a first identity, a second identity, and an identity of a second application program, the first identity having a first association relationship with the first user account in the second application program, the second identity having the first association relationship with the a second user account corresponding to the second terminal in the first application program, and the second identity having a second association relationship with the first identity in the second application program; processing, by the server, the first processing request, and sending the instant message to the second terminal according to the second identity; and displaying, by the second terminal, the received instant message by using the second application program, or displaying, by the second terminal, the received instant message by using the first application program and the second application program.

An embodiment of the present invention provides another instant message processing method, including; receiving, by a server, a first processing request sent by a first terminal, the first processing request being generated by the first terminal according to an instant message that is input by a user and acquired by using a first application program, the first processing request being used for requesting the server to send the instant message to a second terminal, the first processing request including: the instant message, a first user account, a first identity, a second identity, and an identity of a second application program, the first identity having a first association relationship with the first user account in the second application program, the second identity having the first association relationship with the a second user account corresponding to the second terminal in the first application program, and the second identity having a second association relationship with the first identity in the second application program; and processing the first processing request, and sending the instant message to the second terminal according to the second identity, so that the second terminal displays the received instant message by using the second application program, or the second terminal displays the received instant message by using the first application program and the second application program.

An embodiment of the present invention provides an instant message processing apparatus, running on a server, including: a receiving module, configured to receive a first processing request sent by a first terminal, the first processing request being generated by the first terminal according to an instant message that is input by a user and acquired by using a first application program, the first processing request being used for requesting the server to send the instant message to a second terminal, the first processing request including; the instant message, a first user account, a first identity, a second identity, and an identity of a second application program, the first identity having a first association relationship with the first user account in the second application program, the second identity having the first association relationship with the a second user account corresponding to the second terminal in the first application program, and the second identity having a second association relationship with the first identity in the second application program; and a processing module, configured to process the first processing request received by the receiving module, and send the instant message to the second terminal according to the second identity, so that the second terminal displays the received instant message by using the second application program, or the second terminal displays the received instant message by using the first application program and the second application program.

An embodiment of the present invention provides an instant message processing system, including: a first terminal, a second terminal, and a server on which the instant message processing apparatus runs, the first terminal being configured to acquire by using a first application program, an instant message input by a user, generate a first processing request according to the instant message, and send the first processing request to the server; and the second terminal being configured to receive the instant message sent by the server, and display the received instant message by using a second application program, or the second terminal displaying the received instant message by using the first application program and the second application program.

With the instant message processing method, apparatus, and system provided in the embodiments of the present invention, a first terminal generates a first processing request according to an instant message input by a user, and sends the first processing request to a server, then the server processes the first processing request, and sends the instant message to a second terminal according to a second identity in the first processing request, and the second terminal displays the received instant message by using a second application program, or the second terminal displays the received instant message by using a first application program and the second application program, so that the instant message can be transferred between different application programs, thereby improving the efficiency of instant message processing.

To make the foregoing and other objectives, features, and advantages of the present disclosure more comprehensible, detailed description is made below with reference to the accompanying draw tugs by using preferred embodiments.

DESCRIPTION OF EMBODIMENTS

To further describe the technical measures and functions used by the present disclosure to implement the pre-determined objectives, specific implementation manners, structures, features, and functions based on the present disclosure are described below in detail with reference to the accompanying drawings and preferred embodiments.

Figure 1:
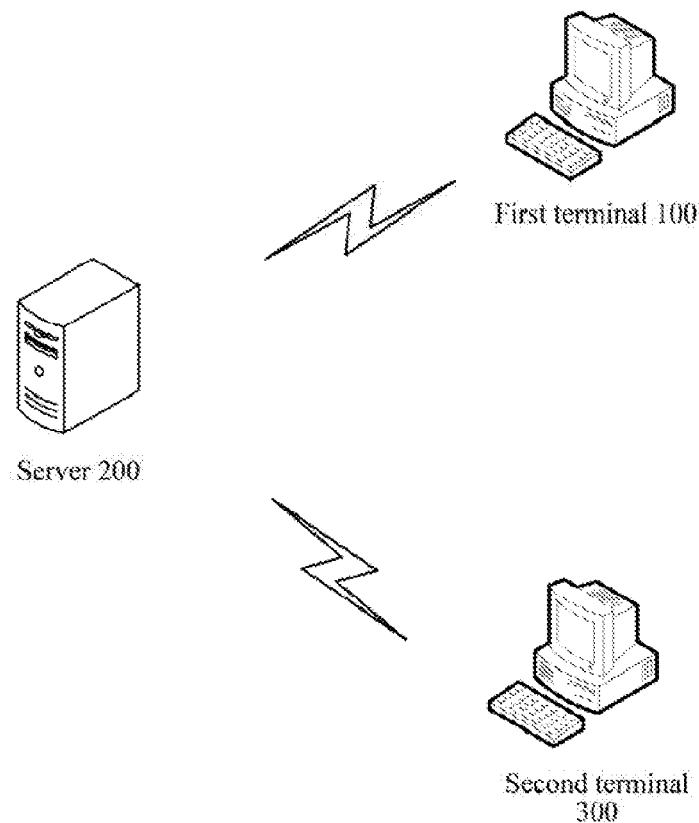
FIG. 1 is a diagram of an application environment of an instant message processing method, apparatus, and system according to the disclosure.

An instant message processing method provided in embodiments of the present invention may be applied to an application environment shown in FIG. 1, to implement instant message processing. As shown in FIG. 1, a first terminal 100, a server 200, a second terminal 300 are located in a wireless network or a wired network, and the first terminal 100, the server 200, and the second terminal 300 perform data exchange through the wireless network or the wired network.

The first terminal 100 is the same as the second terminal 300, and both may include a smart phone, a tablet computer, an e-book reader, a moving picture experts group audio layer III (MP3) player, a moving picture experts group audio layer IV (MP4) player, a portable laptop computer, a desktop computer, an in-vehicle computer, an all-in-one machine, and the like.

Figure 2:
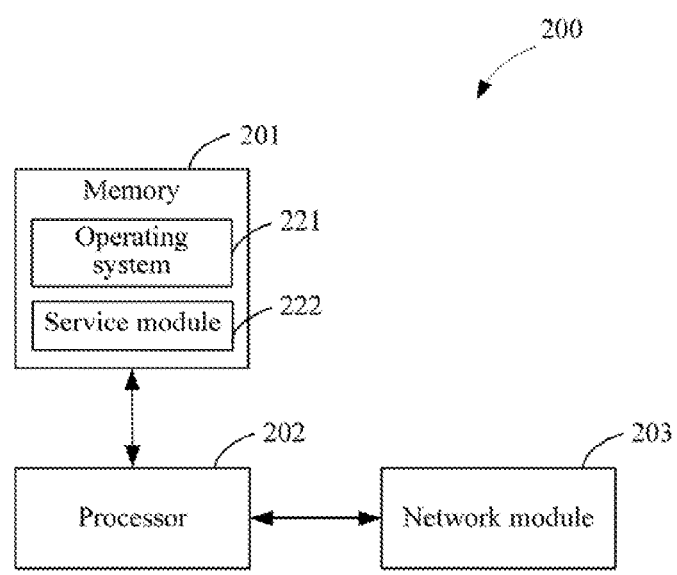
FIG. 2 shows a structural block diagram of a server.

FIG. 2 shows a structural block diagram of a server. As shown in FIG. 2, the server 200 includes: a memory 201, a processor 202, and a network module 203.

It may be understood that, the structure shown in FIG. 2 is merely exemplary, the server 200 may also include more or fewer components than those shown in FIG. 2, or has a configuration different from that shown in FIG. 2. The components shown in FIG. 2 may be implemented by using hardware, software, or a combination thereof. In addition, the server in the embodiments of the present invention may further include multiple servers having different functions.

The memory 201 may be configured to store a software program and module, for example, program instructions modules corresponding to the instant message processing method, apparatus, and system in the embodiments of the present invention. The processor 202 runs the software program and module in the memory 201 to implement various function application and data processing, that is, implement the instant message processing method in the embodiments of the present invention. The memory 201 may include a high speed random access memory, and may further include a non-volatile memory, for example, one or more magnetic storage apparatuses, a flash memory, or another non-volatile solid-state memory. In some embodiments, the memory 201 may further include a memory disposed remote to the processor 202, and the remote memory may be connected to the server 200 through a network. Further, the software program and module may further include: an operating system 221 and a service module 222. The operating system 221 such as LINUX, UNIX, or WINDOWS may include various software components and/or drives configured to manage system tasks (for example, management of memory, control of a storage device, management of a power supply, and the like), and can communicate with various hardware or software components, to provide a running environment for other software components. The service module 222 runs on the operating system 221, and listens to a request from a network by using a network service of the operating system

221, completes corresponding data processing according to the request, and returns a processing result to a client. That is, the service module 222 is configured to provide a network service to the client.

The network module 203 is configured to receive and send a network signal. The network signal may be a wireless signal or a wired signal. In one embodiment, the network signal is a wired network signal. In this case, the network module 203 may include elements such as a processor, a random access memory, a converter, and a crystal oscillator.

First Embodiment

Figure 3:
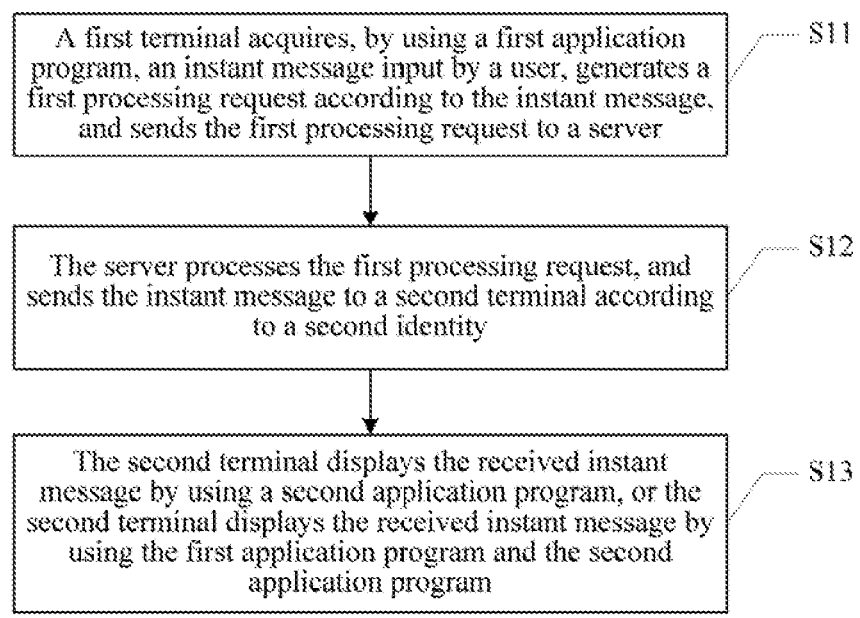
FIG. 3 is a flowchart of an instant message processing method, according to a first embodiment of the present invention.

FIG. 3 is a flowchart, of an instant message processing method according to the first embodiment of the present invention. In this embodiment, the instant message processing method is implemented by means of data exchange between a first terminal 100, a server 200, and a second terminal 300. As shown in FIG. 3, the instant message processing method in this embodiment includes the following steps:

Step S11: The first terminal acquires, by using a first application program, an instant message input by a user, generates a first processing request according to the instant message, and sends the first processing request to the server.

The first application program may be various types of client programs that are pre-configured in the first terminal 100 or the second terminal 300 and have an instant message receiving and sending function, such as a network game client program (for example, an Audition Online client program or a World of Warcraft client program) or an instant messaging client program (for example, Weixin, Tencent QQ, or a Hujiang CCTalk client program).

The first processing request is used for requesting the server 200 to send the instant message input by the user in the first application program to the second terminal 300, so that the second terminal 300 displays the instant message by using a second application program. The second application program may be various types of client programs that are pre-configured in the first terminal 100 or the second terminal 300 and have an instant message receiving and sending function. Different from the first application program, the second application program supports a data exchange protocol different from that of the first application program.

The first processing request may include: the instant message, a first user account, a first identity, a second identity, and an identity of the second application program. The first identity has a first association relationship with the first user account in the second application program. The first association relationship may be regarded as a subordination relationship, that is, the first identify belongs to the first user account, a management operation (creation or deletion) may be performed on the first identity in the second application program by using the first user account, and there may be multiple first identities. For example, assuming that the second application program is a network game client program, the first identities may be identities of multiple game characters treated by the user in the second application program by using the first user account. It may be understood that the first identity may also indirectly have the first association relationship with the first user account due to another user account bound to the first user account. For example, if the user uses the first user account in the first application program and uses another user account in the second application program, and the user binds in advance the first user account to the another user account, multiple game characters created by using the another user account may have the first association relationship with the first user account because the another user account is bound to the first user account.

The second identity has the first association relationship with a second user account corresponding to the second terminal in the first application program, and the second identity has a second association relationship with the first identity in the second application program. The second association relationship may be regarded as an equal relationship, for example, a friend relationship in a game.

Step S12: The server processes the first processing request, and sends the instant message to the second terminal according to a second identity.

The server 200 may process the first processing request sent by the first terminal 100, for example, convert the first processing request to a processing request supporting the data exchange protocol supported by the second application program. Then the server 200 may send the converted first processing request to the second terminal 300, so that the second terminal 300 can display the instant message in the processing request by using the second application program. Alternatively, the server 200 may send both the first processing request on which the data exchange protocol conversion is performed and the first processing request on which no data exchange protocol conversion is performed to the second terminal 300, so that the second terminal 300 can display the received instant message by using the first application program and the second application program.

Step S13: The second terminal displays the received instant message by using the second application program, or the second terminal displays the received instant message by using the first application program and the second application program.

With the instant message processing method provided in this embodiment of the present invention, a first terminal generates a first processing request according to an instant message input by a user, and sends the first processing request to a server, then the server processes the first processing request, and sends the instant message to a second terminal according to a second identity in the first processing request, and the second terminal displays the received instant message by using a second application program, or the second terminal displays the received instant message by using a first application program and the second application program, so that the instant message can be transferred between different application programs, thereby improving the efficiency of instant message processing.

Second Embodiment

Figure 4:
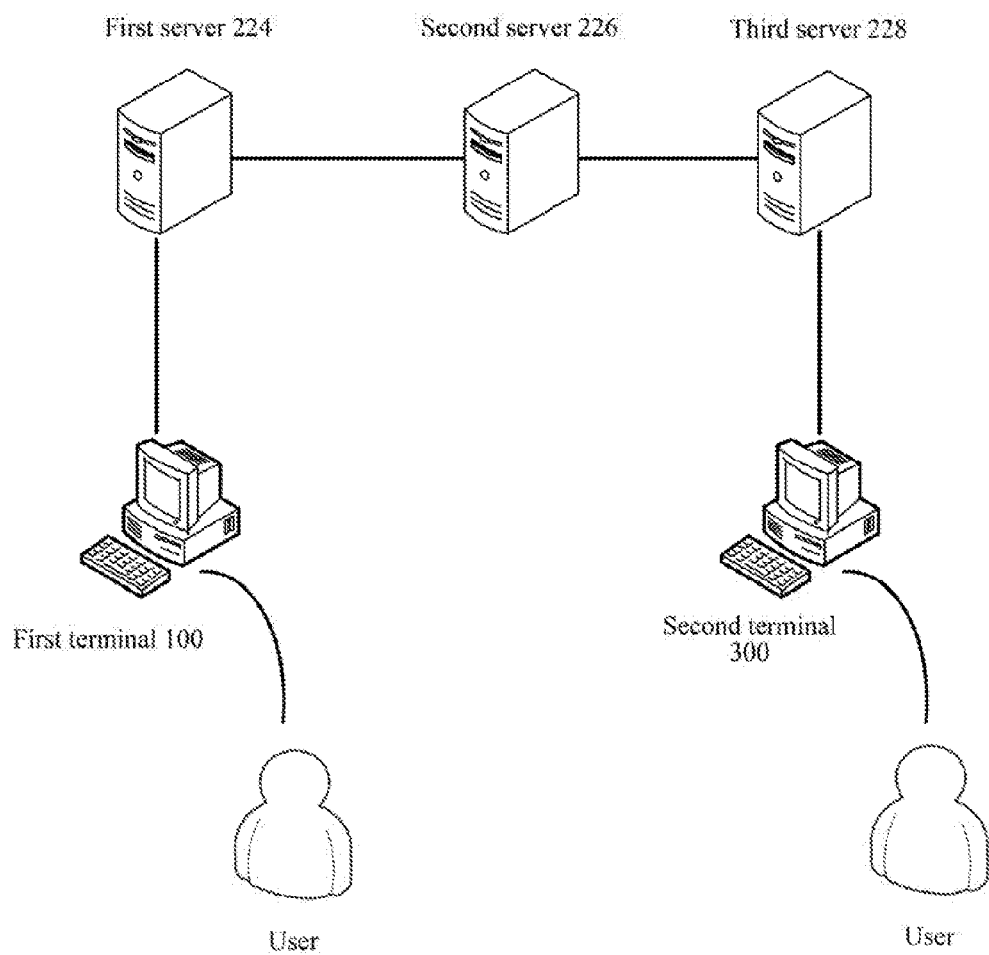
FIG. 4 is a diagram of an application environment of an instant message processing method according to a second embodiment of the present invention.
Figure 5:
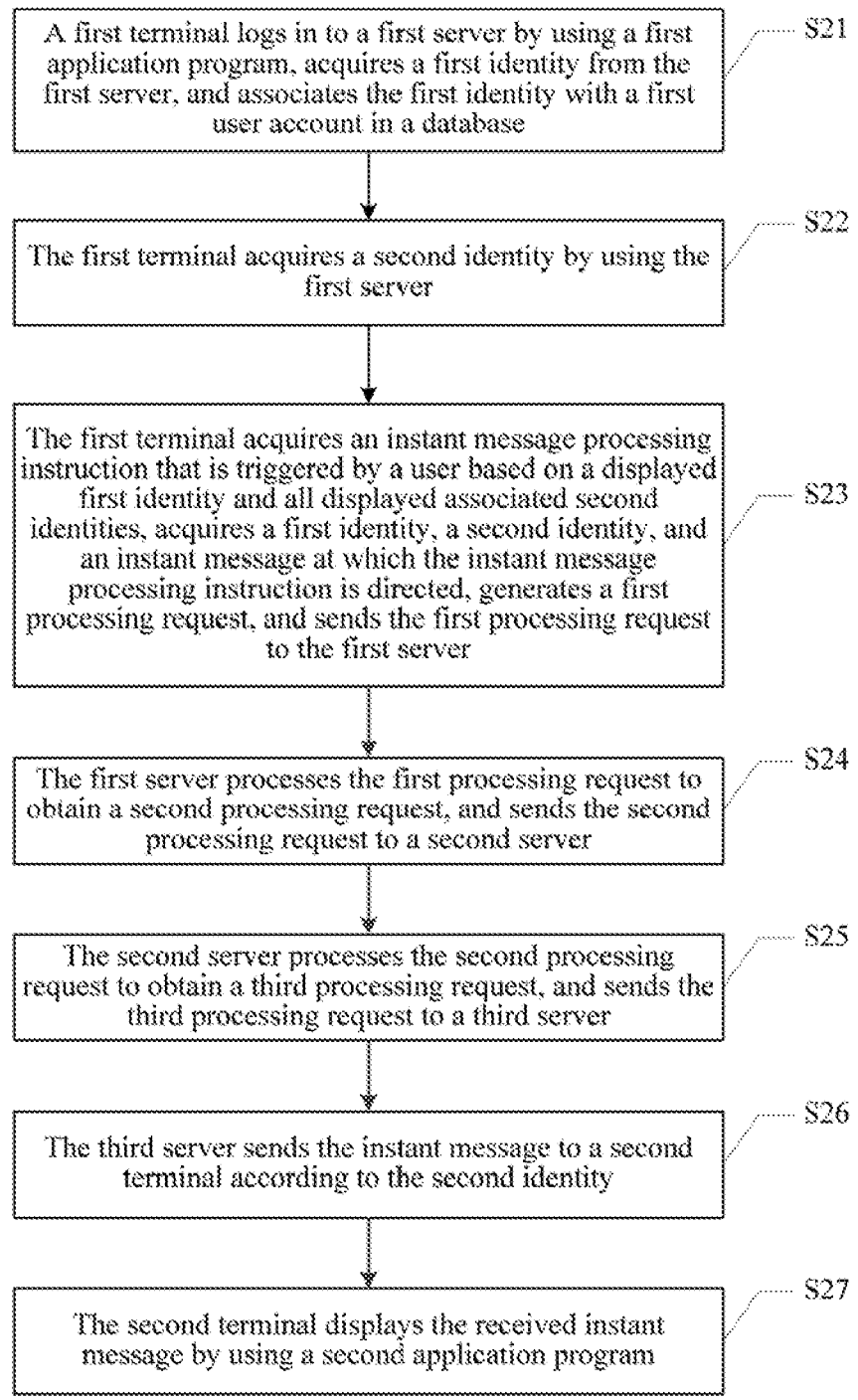
FIG. 5 is a flowchart of the instant message processing method according to the second embodiment of the present invention.

FIG. 4 is a diagram of an application environment of an instant message processing method according to the second embodiment of the present invention. FIG. 5 is a flowchart of the instant message processing method according to this embodiment. In this embodiment, functions of a server 200 may be completed jointly by a first server 224, a second server 226, and a third server 228, where the first server 224 is an agent server on a side of a first application program, the second server 226 is an agent server on a side of a second application program, and the third server is a logical server on a side of the second application program. In this embodiment, the instant message processing method is implemented by means of data exchange between a first terminal 100, the first server 224, the second server 220, the third server 228, and a second terminal 300. As shown in FIG. 5, the instant message processing method in this embodiment includes the following steps:

Step S21: The first terminal logs in to the first server by using the first application program, acquires a first identity from the first server, and associates the first identity with a first user account in a database.

Figure 6:
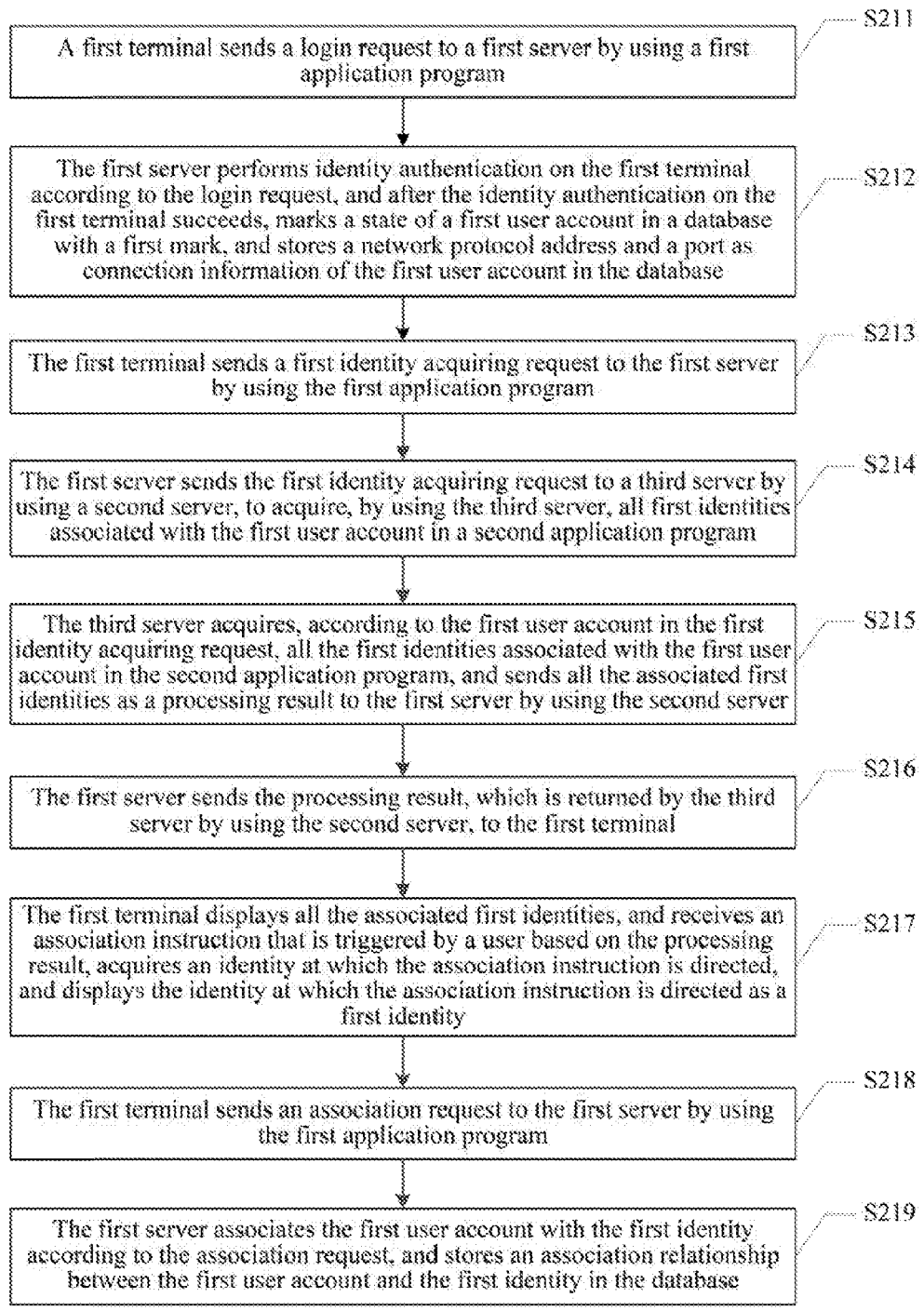
FIG. 6 is a flowchart of some steps of the instant message processing method according to the second embodiment of the present invention.

As shown in FIG. 6, this step specifically may include the following steps:

Step S211: The first terminal sends a login request to the first server by using the first application program.

The first application program may be various types of client programs that run in the first terminal 100, can support a first data exchange protocol, and have an instant message receiving and sending function, such as a network game client program (for example, an Audition Online client program or a World of Warcraft client program) or an instant messaging client program (for example, Weixin, Tencent QQ, or a Hujiang CCTalk client program). It may be understood that, the second terminal 300 may also have the first application program running therein.

The login request includes: the first user account, a login password, and information about a network protocol address and port of the first terminal 100. The first user account and the login password are used for identity authentication, the first user account and the information about the network protocol address and the port may be used for the first server 224 to send an instant message to the first terminal 100.

Step S212: The first server 224 performs identity authentication on the first terminal 100 according to the login request, and after the identity authentication on the first terminal 100 succeeds, marks a state of the first user account in the database with a first mark, and stores a network protocol address and a port as connection information of the first user account in the database.

The database is preferably disposed in an independent database server. In a specific implementation manner of this embodiment, the state marked with the first mark may include any one of non-offline states such as online, invisible, and away.

Step S213: The first terminal sends a first identity acquiring request to the first server by using the first application program.

The first identity acquiring request includes the first user account, and the first identity acquiring request is used for requesting information about all first identities associated with the first user account in the second application program to be acquired from the first server.

It may be understood that, the second application program is not limited to one certain application program, and may also be multiple homogeneous application programs that have an association relationship with the first user account, that is, the second application program may be multiple homogeneous application programs that can allow a user to obtain a pre-configured service by using the first user account or another user account bound to the first user account. For example, assuming that the second application program is a network game client program, if a user can obtain a game service from a server of Warcraft and Audition Online by using the first user account or another user account bound to the first user account, and by using the first user account or the another user account bound to the first user account, the user creates characters A and B in Warcraft and creates a character C in Audition Online, the first identity acquiring request is used for requesting first identities associated with the first user account or the another user account bound to the first user account in all second application programs, that is, identities of all the characters A, B, and C created by the user in Warcraft and Audition Online by using the first user account or the another user account bound to the first user account, to be acquired from the first server.

Step S214: The first server sends the first identity acquiring request to the third server by using the second server, to acquire, by using the third server, all first identities associated with the first user account in the second application program.

Step S215: The third server acquires, according to the first user account in the first identity acquiring request, all the first identities associated with the first user account in the second application program, and sends all the associated first identities as a processing result to the first server by using the second server.

The all first identities associated with the first user account in the second application program are all identities in the second application program that have a first association relationship with the first user account. The first association relationship may be regarded as a subordination relationship, that is, a first identity belong to the first user account, a management operation (creation or deletion) may be performed on the first identity in the second application program by using the first user account, and there may be multiple first identities. For example, assuming that the second application program is a network game client program, the first identities may be identities of multiple game characters created by the user in the second application program by using the first user account. It may be understood that, a first identity may also indirectly have the first association relationship with the first user account due to another user account bound to the first user account. For example, if the user uses the first user account in the first application program and uses another user account in the second application program, but the user binds in advance the first uses account to the another user account, multiple game characters created by using the another user account may have the first association relationship with the first user account because the another user account is bound to the first user account.

Step S216: The first server sends the processing result, which is returned by the third server by using the second server, to the first terminal.

Step S217: The first terminal displays all the associated first identities, receives an association instruction that is triggered by a user based on the processing result, acquires an identity at which the association instruction is directed, and displays the identity at which the association instruction is directed as the first identity.

The first terminal 100 displays, by using the first application program, all the first identities associated with the first user account in the second application program that are returned by the first server 224 as the processing result, receives the association instruction that is triggered by the user based on all the displayed associated first identities, acquires the identity at which the association instruction is directed, and displays the identity at which the association instruction is directed as the first identity, so that the user manages the first identity by using the first terminal 100. It may be understood that, the user can select, at any time by using the first application program, any one or more of all the displayed associated first identities, to associate the one or more first identities with the first user account.

Step S218: The first terminal sends in association request to the first server by using the first application program, where the association request includes information about the first user account and the first identity, which are used for the first server to associate the first user account with the first identity in the database.

Step S219: The first server associates the first user account with the first identity according to the association request, and stores an association relationship between the first user account and the first identity in the database.

Step S22: The first terminal acquires a second identity by using the first server.

Figure 7:
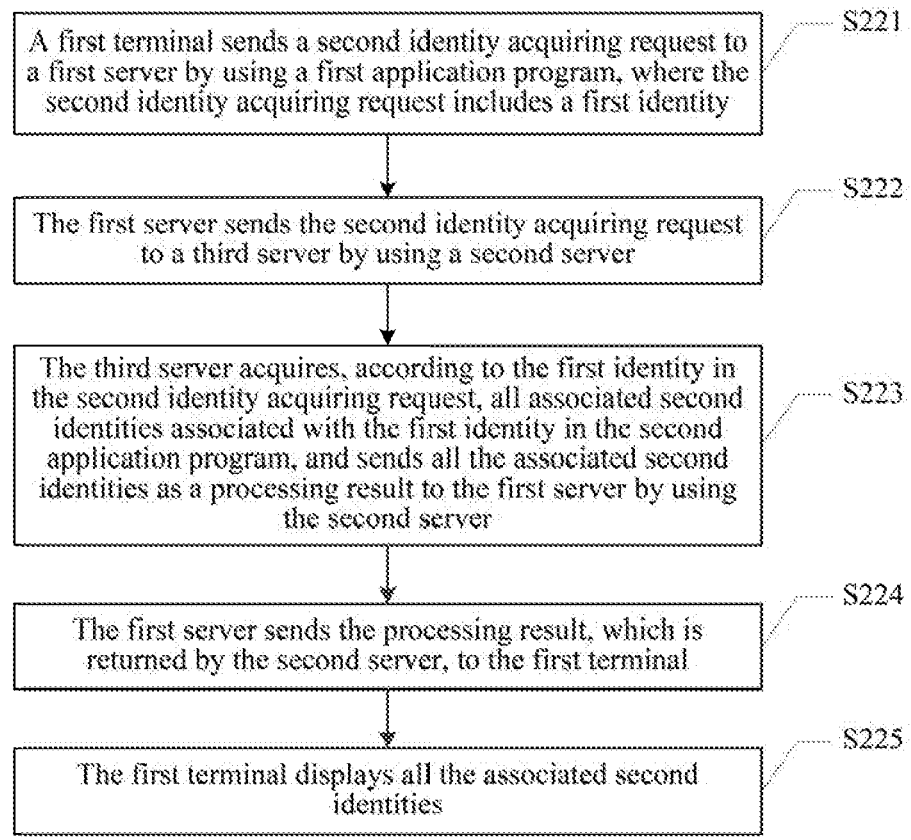
FIG. 7 is a flowchart of some steps of the instant message processing method according to the second embodiment of the present invention.

As shown in FIG. 7, this step specifically may include the following steps:

Step S221: The first terminal sends a second identity acquiring request to the first server by using the first application program, where the second identity acquiring request includes the first identity.

The second identity acquiring request is used for requesting all associated second identities associated with the first identity in the second application program to be acquired from the first server 224. The second application program may be various types of client programs that run in the first terminal 100 or the second terminal 300, can support a second data exchange protocol, and have an instant message receiving and sending function. The all associated second identities have a second association relationship with the first identity in the second application program. The second association relationship may be regarded as an equal relationship, for example, a friend relationship, a union member relationship, or a group member relationship in a game.

Step S222: The first server sends the second identity acquiring request to the third server by using the second server.

Step S223: The third server acquires, according to the first identity in the second identity acquiring request, all associated second identities associated with the first identity in the second application program, and sends all the associated second identities as a processing result to the first server by using the second server.

Step S224: The first server sends the processing result, which is returned by the second server, to the first terminal.

Step S225: The first terminal displays all the associated second identities.

Step S23: The first terminal acquires an instant message processing instruction that is triggered by the user based on the displayed first identity and all the displayed associated second identities, acquires the first identity, the second identity, an identity of the second application program, and an instant message at which the instant message processing instruction is directed, generates a first processing request, and sends the first processing request to the first server.

The first terminal 100 displays, by using the first application program, the processing result sent by the first server, that is, displays all the associated second identities having the second association relationship with the first identity in the second application program.

The first terminal 100 acquires the instant message processing instruction that is triggered by the user in the first application program based on the displayed first identity and all the displayed associated second identities, acquires the first identity, the second identity, the identity of the second application program, and the instant message at which the instant message processing instruction is directed, generates the first processing request, and then sends the first processing request to the first server 224 by using the first application program.

The first processing request is used for requesting the first server 224 to send the instant message to the second terminal 300, the first processing request includes: the instant message, the first user account, the first identity, the second identity, and the identity of the second application program, the first identity has the first association relationship with the first user account in the second application program, the second identity has the first association relationship with the second user account corresponding to the second terminal in the first application program, and the second identity has the second association relationship with the first identity in the second application program.

Step S24: The first server processes the first processing request to obtain a second processing request, and sends the second processing request to the second server.

Figure 8:
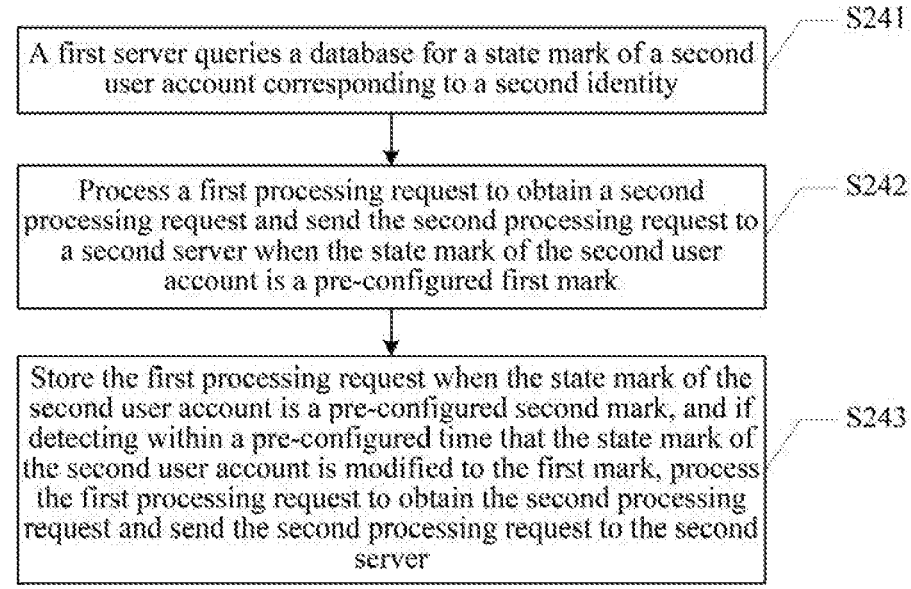
FIG. 8 is a flowchart of some steps of the instant message processing method according to the second embodiment of the present invention.

As shown in FIG. 8, this step specifically may include the following steps:

Step S241: The first server queries the database for a state mark of a second user account corresponding to the second identity.

Step S242: Process the first processing request to obtain the second processing request and send the second processing request to the second server when the state mark of the second user account is a pre-configured first mark.

When by querying the database, the first server 224 obtains the second user account corresponding to the second identity, and obtains that the state mark of the second user account is the pre-configured first mark, that is, the second user account is in a non-offline state (indicating that the second user account is being used), the first server 224 processes the first processing request to obtain the second processing request. The second processing request supports a third data exchange protocol and includes content in the first processing request. The third data exchange protocol may be a text protocol similar to the eXtensible Markup Language (XML) protocol or the JavaScript Object Notation (JSON) protocol. The third data exchange protocol may be constructed by a sending-party identity (the first identity), a receiving-party identity (the second identity), the identity of the second application program, and sent content (the instant message).

Then the first server 224 sends the second processing request to the second server 226.

Step S243: Store the first processing request when the state mark of the second user account is a pre-configured second mark, and if detecting within a pre-configured time that the state mark of the second user account is modified to the first mark, process the first processing request to obtain the second processing request and send the second processing request to the second server.

In a specific implementation manner of this embodiment, the second mark indicates that the second user account is in an offline state, that is, a state in which the second user account is not used, that is, the instant message cannot be sent in time to the second terminal 300 corresponding to the second user account. The first server 224 stores the first processing request when the state mark of the second user account is the pre-configured second mark, and if defecting within the pre-configured time that the state mark of the second user account is modified to the first mark, processes the first processing request to obtain the second processing request and sends the second processing request to the second server.

Step S25: The second server processes the second processing request to obtain a third processing request, and sends the third processing request to the third server, where the third processing request supports a second data exchange protocol and includes content in the first processing request.

Step S26: The third server sends the instant message to the second terminal according to the second identity.

The third server acquires, according to the second identity, the second user account corresponding to the second identity and information about a network protocol address and port of the second terminal 300 corresponding to the second user account, and sends the instant message to the second terminal 300 according to the information about the network protocol address and the port.

Step S27: The second terminal displays the received instant message by using the second application program.

With the instant message processing method provided in this embodiment of the present invention, a first server, a second server, and a third server successively process a first processing request that is sent by a first terminal by using a first application program, then an instant message in the first processing request is sent to a second terminal according to a second identity in the first processing request, and finally the second terminal displays the received instant message by using a second application program, or the second terminal displays the received instant message by using the first application program and the second application program, so that the instant message can be transferred between different application programs, thereby expanding the transfer scope of the instant message, and improving the efficiency of instant message processing.

Third Embodiment

In this embodiment, an instant message processing method provided in the third embodiment of the present invention is described with reference to FIG. 9 to FIG. 12 by using an example in which a first application program is an instant messaging client program and a second application program is a game client program and focusing on sending an instant message to a second terminal by using the first application program running on a first terminal, and displaying the instant message by using a second application program running on the second terminal.

Figure 9:
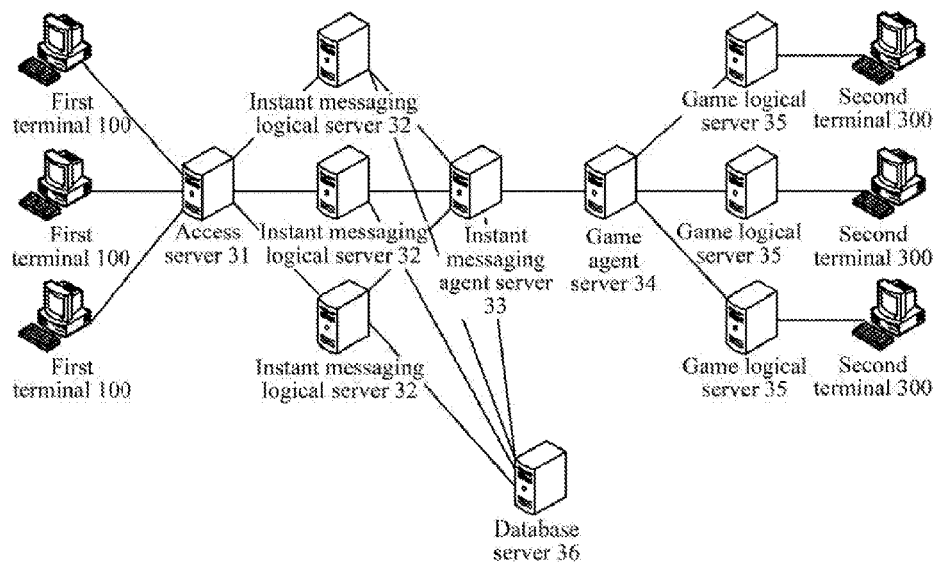
FIG. 9 is a diagram of an application environment of an instant message processing method according to a third embodiment of the present invention.

FIG. 9 is a diagram of an application environment of this embodiment. As shown in FIG. 9, a first terminal 100, an access server 31, an instant messaging logical server 32, an instant messaging agent server 33, a game agent server 34, a game logical server 35, a database server 36, and a second terminal 300 are located in a wireless network or a wired network. The devices perform data exchange through the wireless network or the wired network to jointly complete the instant message processing method provided in this embodiment. The first terminal 100 communicates with the access server 31 by using the User Datagram Protocol (UDP), which can reduce a maintenance cost.

In addition, an instant messaging client program used as a first application program runs in the first terminal 100, and a game client program used as a second application program runs in the second terminal 300. The instant messaging client program supports an instant messaging data exchange protocol (a first data exchange protocol), and the game client program supports a game data exchange protocol (a second data exchange protocol). It may be understood that, the first application program and the second application program may also application programs that are of one same type but support different data exchange protocols, for example, Tencent QQ and Feixin.

Figure 10:
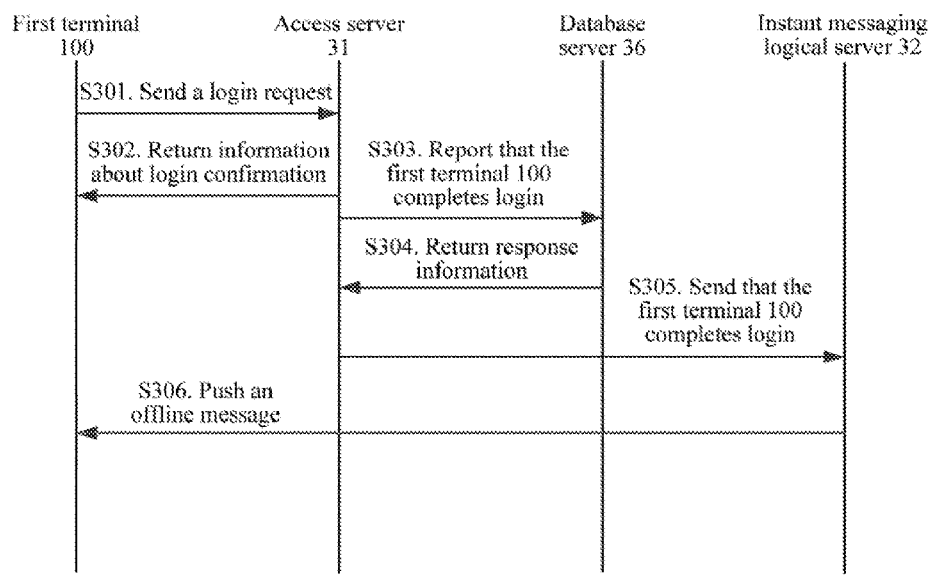
FIG. 10 is a sequence diagram of some steps of the instant message processing method according to the third embodiment of the present invention.

First, referring to FIG. 10, in step S301, the first terminal 100 sends a login request to the access server 31 according to a login instruction that is triggered by a user in the instant messaging client program, where the login request includes: a first user account, a login password, and information about a network protocol address and port of the first terminal 100.

The access server 31 completes login confirmation and security authentication on the first terminal 100 according to the login request sent by the first terminal 100, and after completing the security authentication, performs step S302 to return information about the login confirmation to the first terminal 100, and performs step S303 to report to the database server 36 that the first terminal 100 completes login, so that the database server 36 marks a state of the first terminal 100 with a first mark (a non-offline state). The database server 36 marks the state of the first terminal 100 and performs step S304 to return response information to the access server 31.

In addition, in step S305, the access server 31 sends a message indicating that the first terminal 100 completes login to the instant messaging logical server 32. The instant messaging logical server 32 performs step S306 according to the message to push an offline message corresponding to the first user account to the first terminal 100.

Figure 11:
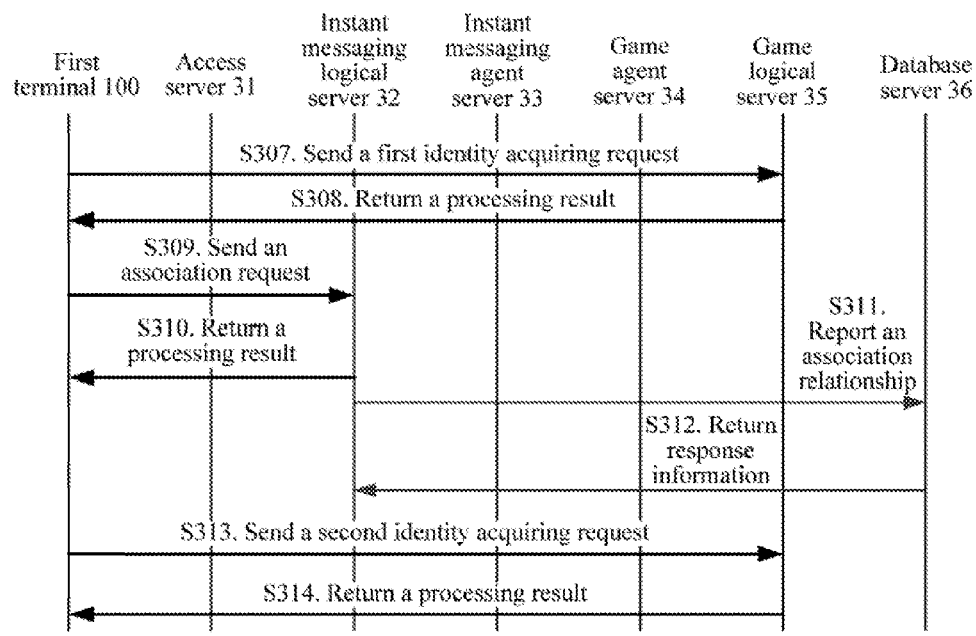
FIG. 11 is a sequence diagram of some steps of the instant message processing method according to the third embodiment of the present invention.

Next, referring to FIG. 11, in step S307, the first terminal 100 sends a first identify acquiring request to the game logical server 35 by successively using the access server 31, the instant messaging logical server 32, the instant messaging agent server 33, and the game agent server 34.

The game logical server 35 queries, according to the first user account in first identity acquiring request, for all first identities associated with the first user account in a game, that is, identities of all characters created by the user by using the first user account, or another user account bound to the first user account, and performs step S308 to return all obtained associated first identities as a processing result to the first terminal 100 by successively using the game agent server 34, the instant messaging agent server 33, the instant messaging logical server 32, and the access server 31.

The first terminal 100 displays all received associated first identities by using the instant messaging client program, acquires, according to an association instruction that is triggered by the user in the instant messaging client program, an identity (one or more selected by the user from all the associated first identities displayed on an interface) at which the association instruction is directed, and displays the identity at which the association instruction is directed as a first identity (equivalent to adding a character, selected by the user, in the game to a subordinate management catalog of the first user account), and performs step S309 to send an association request to the instant messaging logical server 32 by using the access server 31, where the association request includes is information about the first user account and the first identity at which the association instruction of the user is directed. The instant messaging logical server 32 associates the first user account with the first identity, and performs step S310 to return a processing result to the first terminal 100, and also performs step S311 to report an association relationship between the first user account and the first identity to the database server 36. The database server 36 stores the association relationship between the first user account and the first identity according to the association relationship reported by the instant messaging logical server 32, and performs step S312 to return response information to the instant messaging logical server 32 according to a storage result. It may be understood that, because the game generally applies region division, and when the associated first identity is in region division, association is performed according to a region to which the first identity belongs, or otherwise, association is directly performed.

In step S313, the first terminal 100 sends a second identity acquiring request to the game logical server 35 by successively using the access server 31, the instant messaging logical serves 32, the instant messaging agent server 33, and the game agent server 34, where the second identity acquiring request includes the first identity. The second identity acquiring request is used for acquiring all associated second identities associated with the first identity in the game (identifies of other characters having a friend relationship or a team organization relationship or a union relationship with the character created by the user in the game). The game logical server 35 queries, according to the first identity in the second identity acquiring request, all the associated second identities associated with the first identity in the game, and performs step S314 to return all obtained associated second identities as a processing result to the first terminal 100 by successively using the game agent server 34, the instant messaging agent server 33, the instant messaging logical server 32, and the access server 31. The first terminal 100 displays all returned associated second identities by using the instant messaging client program.

Figure 12:
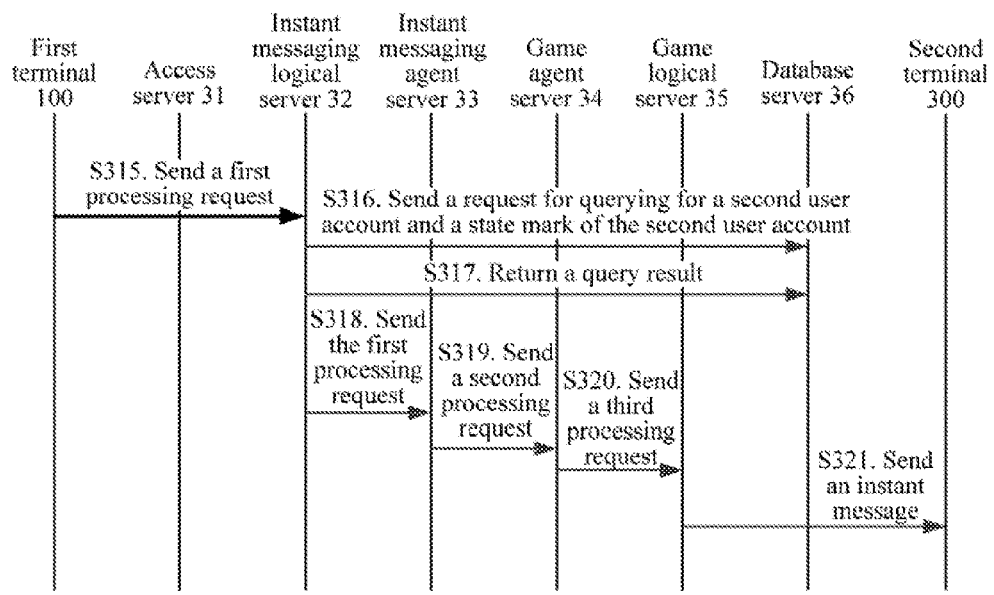
FIG. 12 is a sequence diagram of some steps of the instant message processing method according to the third embodiment of the present invention.

Further, referring to FIG. 12, when detecting an instant message processing instruction that is triggered by the user in the instant messaging client program based on the displayed first identity and all the displayed associated second identity, the first terminal 100 acquires the first identity (that is, a character in the game selected as a sending party by the user), a second identity (that is, a character in the game selected as a receiving party by the user), an identity of the game (that is, an identity of the second application program), and an instant message at which the instant message processing instruction is directed, generates a first processing request, where the first processing request supports the instant messaging data exchange protocol, and performs step S315 to send the first processing request to the instant messaging logical server 32 by using the access server 31. The instant messaging logical server 32 detects whether a state of the first processing request is normal, and when the state of the first processing request is normal, performs step S316 to send, to the database server 36, a request for querying for a second user account corresponding to the second identity and a state mark of the second user account, where the request includes information about the second identity. It may be understood that, the instant messaging logical server 32 may receive state information of the first user account of the second user account that is periodically reported by the first terminal 100 or the second terminal 300 by using the instant messaging client program, and send the received state information of the first user account or the second user account to the database server 36, so that the database 36 continuously updates the state mark of the first user account or the second user account according to the state information sent by the instant messaging logical server 32. The database server 36 on queries, according to the information about the second identity in the request, for the second user account corresponding to the second identity and the state mark of the second user account, and performs step S317 to return a query result to the instant messaging logical server 32. When the query result is that the state mark of the second user account is a first mark (that is, a non-offline state), the instant messaging logical server 32 processes the first processing request, and sends the instant message in the first processing request to the second terminal 300 according to the second user account in the query result. When the query result is that the state mark of the second user account is a second mark (that is, an offline state), the instant message in the first processing request is stored as an offline message, and if it is detected within a pre-configured time (for example, within 7 days), that the mark of the second user account is updated to the first mark, the instant message is pushed to the second terminal 300.

Meanwhile, the instant messaging logical server 32 performs step S318 to send the first processing request to the instant messaging agent server 33. The instant messaging agent server 33 converts the first processing request to a second processing request supporting a third data exchange protocol, where the second processing request includes content in the first processing request. Then the instant messaging agent server performs routing control according to the identity of the game in the first processing request, determines the game agent 34 from multiple candidate game agent servers, and performs step S319 to send the second processing request to the game agent server 34.

The game agent server 34 converts the second processing request supporting the third data exchange protocol to a third processing request supporting the game data exchange protocol, where the third processing request includes content in the second processing request, and also determines the game logical server 35 according to network traffic of candidate game logical servers, and performs step S320 to send the third processing request to the game logical server 35.

The game logical server 35 processes the third processing request, queries for whether the state mark of the second identity in the third processing request is the first mark (that is, a non-offline state), and if the state mark of the second identity is the first mark, performs step S321 to send the instant message in the third processing request to the second terminal 300 corresponding to the second identity. The second terminal receives the instant message sent by the game logical server 35 and displays the instant message to the user by using a game client. If the state mark of the second identity is the second mark (that is, an offline state), the instant message is stored as an offline message, and when it is detected that the second terminal 300 logs in to the game logical server 35, that is, the state mark of the second identify is updated to the first mark, the instant message is sent to the second terminal 300. It may be understood that, the instant message sent by the first terminal may be a one-to-one private message, and may also be a group-sent message (for example, a team organization message or a union message, meaning that there are multiple receiving parties). Preferably, the private message may be stored at a user dimension, where the message is stored only in a mailbox of a receiving party, and a sending party does not store sending information thereof. The union message is stored only in a table at a union dimension, and all union members share the storage table, that is, data is not written to a mailbox of each union member (writing diffusion).

A principle offending an instant message to the first terminal 100 by using the game client program (the second application program) running in the second terminal 300, and displaying the instant message by using the instant messaging client program (the first application program) running in the first terminal 100 is basically the same as that described above of sending the instant message to the second terminal 300 by using the first application program (the instant messaging client program) running in the first terminal 100, and displaying the instant message by using the second application program (the game client program) running in the second terminal 300.

It may be understood that, when the instant message is sent to the first terminal 100 by using the game client program (the second application program running in the second terminal 300, and the instant message is displayed by using the instant messaging client program (the first application program) running in the first terminal 100, the game logical server 35 receives a first processing request sent by the second terminal 300, where the first processing request supports the game data exchange protocol, and includes a first identity (that is, a character in a game selected as a sending party by the user), a second identity (that is, the character in the game selected as a receiving party by the user), an identity of the game, and an instant message, and generates the first processing request, where the first processing request supports the game data exchange protocol. The game logical server 35 processes the first processing request and sends the instant message in the first processing request to the first terminal 100, so that the first terminal 100 displays the instant message to the user by using the game client program.

Meanwhile, the game logical server 35 sends the first processing request to the game agent server 34. Then the game agent server converts the first processing request to a second processing request supporting the third data exchange protocol, where the second processing request includes content in the first processing request, and sends the second processing request to the instant messaging agent server 33. Next, the instant messaging agent server 33 converts the second processing request into a third processing request supporting the instant messaging data exchange protocol, where the third processing request includes content in the second processing request, and sends the third processing request to the instant messaging logical server 32. The instant messaging logical server 32 processes the third processing request, and queries the database server 36 for a state mark of a first user account used when the first terminal 100 corresponding to the second identity logs in, and when the state mark is the first mark (that is, a non-offline state), sends the instant message (including private information and union information) in the third processing request to the first terminal 100. When the state mark is the second mark (that is, an offline state), if the instant message is private information, the instant message is stored as an offline message, and if it is detected within a pre-configured time, that the first terminal 100 completes login by using the first user account, the offline-message is pushed to the first terminal 100.

With the instant message processing method provided in this embodiment of the present invention, an instant messaging agent server is deployed on a side of a first terminal, a game agent server is deployed on a side of a second terminal, the instant messaging agent server processes a first processing request that is sent by an instant messaging logical server, includes an instant message, and supports an instant messaging data exchange protocol, to obtain a second processing request supporting a third data exchange protocol, and sends the second processing request to the game agent server, and then the game agent server processes the second processing request to obtain a third processing request supporting a game data exchange protocol, and sends the third processing request to the second terminal by using a game logical server, so that the second terminal displays the instant message in the third processing request to a user by using a game client program. Therefore, the instant message can be transferred between different application programs, thereby expanding the transfer scope of the instant message, and improving the efficiency of instant message processing. In addition, by deploying the instant messaging agent server on a side of the first terminal, and deploying the game agent server on a side of the second terminal, independence and compatibility of the agent servers can be improved, and it is prevented that a processing speed of one side of a network is affected because the other side is busy, thereby further improving the processing efficiency.

Fourth Embodiment

Figure 13:
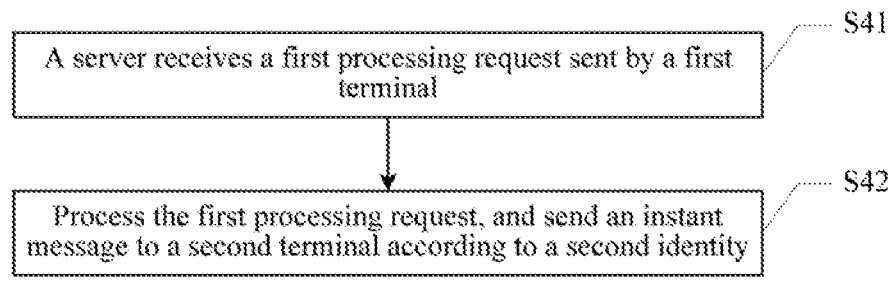
FIG. 13 is a flowchart of an instant message processing method according to a fourth embodiment of the present invention.

FIG. 13 is a flowchart of an instant message processing method according to the fourth embodiment of the present invention. In this embodiment, the instant message processing method provided in this embodiment is described from the perspective of a server 200. As shown in FIG. 13, the instant message processing method in this embodiment includes the following steps:

Step S41: The server receives a first processing request sent by a first terminal, where the first processing request is generated by the first terminal according to an instant message that is input by a user and acquired by using a first application program, the first processing request is used for requesting the server to send the instant message to a second terminal, the first processing request includes: the instant message, a first user account, a first identity, a second identity, and an identity of a second application program, the first identity has a first association relationship with the first user account in the second application program, the second identity has the first association relationship with the a second user account corresponding to the second terminal in the first application program, and the second identity has a second association relationship with the first identity in the second application program.

Step S42: Process the first processing request, and send the instant message to the second terminal according to the second identity, so that the second terminal displays the received instant message by using the second application program, or the second terminal displays the received instant message by using the first application program and the second application program.

Reference may be made to relevant content of the first to third embodiments for details about the steps, which are not further described herein.

With the instant message processing method provided in this embodiment of the present invention, a server processes a first processing request sent by a first terminal, and then sends an instant message in the processed first processing request to a second terminal according to a second identity in the first processing request, so that the second terminal displays the received instant message by using a second application program, or the second terminal displays the received instant message by using a first application program and the second application program. Therefore, the instant message can be transferred between different application programs, thereby expanding the transfer scope of the instant message, and improving, the efficiency of instant message processing.

Fifth Embodiment

Figure 14:
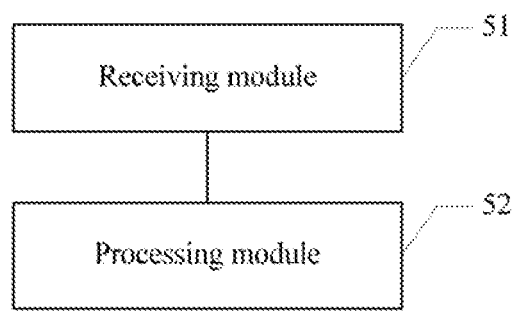
FIG. 14 is a schematic structural diagram of an instant message processing apparatus according to a fifth embodiment of the present invention.

FIG. 14 is a schematic structural diagram of an instant message processing apparatus according to the fifth embodiment of the present invention. The instant message processing apparatus provided in this embodiment can be applied to the instant message processing method in the foregoing embodiments. As shown in FIG. 14, the instant message processing apparatus 50 includes: a receiving module 51 and a processing module 52, where the receiving module 51 is configured to receive a first processing request sent by a first terminal, where the first processing request is generated by the first terminal according to an infant message that is input by a user and acquired by using a first application program, the first processing request is used for requesting the server to send the instant message to a second terminal, the first processing request includes: the instant message, a first user account, a first identity, a second identity, and an identity of a second application program, the first identity has a first association relationship with the first user account in the second application program, the second identity has the first association relationship with the a second user account corresponding to the second terminal in the first application program, and the second identity has a second association relationship with the first identity in the second application program; and the processing module 52 is configured to process the first processing request received by the receiving module 51, and send the instant message to the second terminal according to the second identity, so that the second terminal displays the received instant message by using the second application program, or the second terminal displays the received instant message by using the first application program and the second application program.

Figure 15:
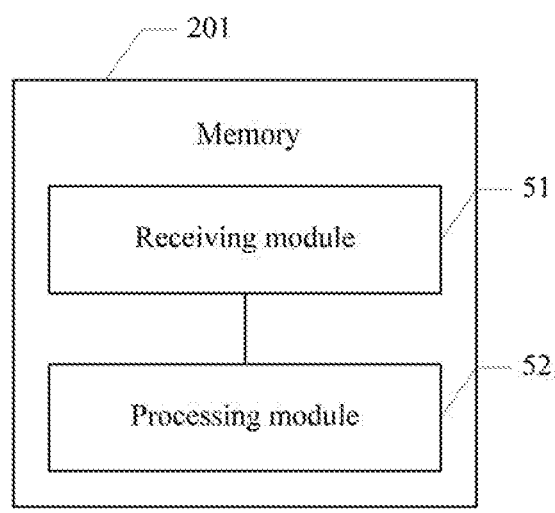
FIG. 15 is a schematic diagram of a storage environment of the apparatus in FIG. 14.

The modules may be implemented by software code. In this case, the modules may be stored in a memory 201, as shown in FIG. 15. The modules may also be implemented by hardware such as an integrated circuit chip.

Refer to specific content described in the embodiments shown in FIG. 1 to FIG. 13 for a specific process of implementing respective functions by the functional modules of the instant message processing apparatus 50 in this embodiment, which is not further described herein.

With the instant message processing apparatus provided in this embodiment of the present invention, a first processing request sent by a first terminal is processed, and then an instant message in the processed first processing request is sent to a second terminal according to a second identity in the first processing request, so that the second terminal displays the received instant message by using a second application program, or the second terminal displays the received instant message by using a first application program and the second application program. Therefore, the instant message can be transferred between different application programs, thereby expanding the transfer scope of the instant message, and improving the efficiency of instant message processing.

Sixth Embodiment

Figure 16:
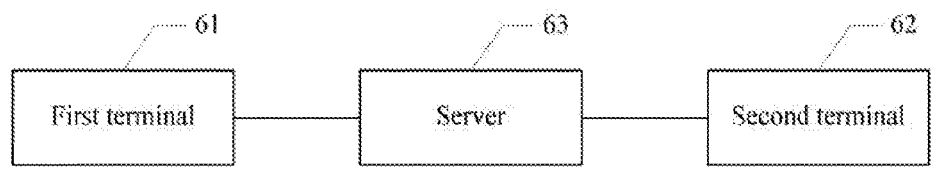
FIG. 16 is a schematic structural diagram of an instant message processing system according to a sixth embodiment of the present invention.

FIG. 16 is a schematic structural diagram of an instant message processing system according to the sixth embodiment of the present invention. The instant message processing system provided in this embodiment can be applied to the instant message processing method and apparatus in the foregoing embodiments. As shown in FIG. 15, the instant message processing system 60 includes: a first terminal 61, a second terminal 62, and a server 63, where the first terminal 61 is configured to acquire, by using a first application program, an instant message input by a user, generate a first processing request according to the instant message, and send the first processing request to the server 63; and the second terminal 62 is configured to receive the instant message sent by the server 63, and display the received instant message by using a second application program, or the second terminal displays the received instant message by using the first application program and the second application program.

Figure 17:
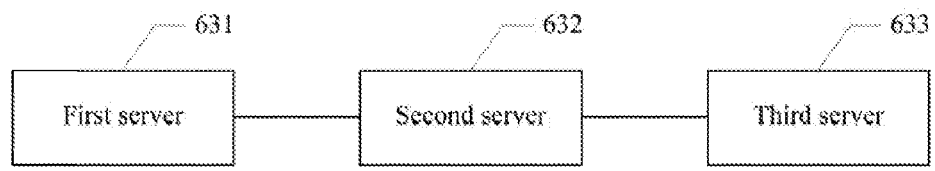
FIG. 17 is a schematic structural diagram of a server in the instant message processing system according to the sixth embodiment of the present invention.

Preferably, as shown in FIG. 17, the server 63 includes: a first server 631, a second server 632, and a third server 633, the first application program supports a first data exchange protocol, and the second application program supports a second data exchange protocol, where the first server 631 is configured to process the first processing request to obtain a second processing request, where the second processing request supports a third data exchange protocol and includes content in the first processing request, and the first server 631 determines the second server according to an identity of the second application program, and sends the second processing request to the second server 632;

the second server 632 is configured to process the second processing request to obtain a third processing request, and send the third, processing request to the third server 633, where the third processing request supports the second data exchange protocol and includes the content in the first processing request; and the third server 633 is configured to send the instant message to the second terminal 62 according to a second identity.

Preferably, the first server 631 is further configured to send the instant message to the second terminal 62 according to the second identity.

Preferably, the first server 631 is further configured to query a database for a state mark of a second user account corresponding to the second identity, and process the first processing request to obtain the second processing request and send the second processing request to the second server 632 when the state mark of the second user account is a pre-configured first mark, or store the first processing request when the state mark of the second user account is a pre-configured second mark, and if detecting within a pre-configured time that the state mark of the second user account is modified to the first mark, process the first processing request to obtain the second processing request and send the second processing request to the second server 632.

Refer to the method in the embodiments corresponding to FIG. 1 to FIG. 13 and the apparatus in the embodiment corresponding to FIG. 14 and FIG. 15 for a specific process of implementing respective functions by the apparatuses in the instant message processing system in this embodiment, which is not further described herein.

With the instant message processing system provided in this embodiment of the present invention, a server processes a first processing request sent by a first terminal, and then sends an instant message in the processed first processing request to a second terminal according to a second identity in the first processing request, so that the second terminal displays the received instant message by using a second application program, or the second terminal displays the received instant message by using a first application program and the second application program. Therefore, the instant message can be transferred between different application programs, thereby expanding the transfer scope of the instant message, and improving the efficiency of instant message processing.

It should be noted that, the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

It should be noted that, the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

A person of ordinary skill in the art may understand that, all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

Descriptions above are merely preferred embodiments of the present invention, and are not intended to limit the present disclosure. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. An instant message processing method, comprising:
    acquiring, by a first terminal by using a first application program, an instant message input by a user, generating a first processing request according to the instant message, and sending the first processing request to a server, the first processing request being used for requesting the server to send the instant message to a second terminal, the first processing request comprising: the instant message, a first user account, a first identity, a second identity, and an identity of a second application program, wherein the first application program and the second application program each processes instant messaging on different platforms, wherein the first application program and the second application program are different application programs which support different data exchange protocols, wherein the first identity having a first association relationship information with the first user account in the second application program, the second identity having the first association relationship information with the a second user account corresponding to the second terminal in the first application program, and the second identity having a second association relationship information with the first identity in the second application program;
    processing, by the server, the first processing request to transform the first processing request which support a data exchange protocol of the first application program to be a transformed processing request which support a data exchange protocol of the second application program, and sending the instant message included in the transformed processing request to the second terminal according to the second identity; and
    displaying, by the second terminal, the received instant message by using the second application program, or displaying, by the second terminal, the received instant message by using the first application program and the second application program;
    wherein:
        the server comprises a first server and a second server,
        the first application program supports a first data exchange protocol,
        the second application program supports a second data exchange protocol, and
        sending the instant message to the second terminal according to the second identity comprises:
            processing, by the first server, the first processing request to obtain a second processing request, wherein the second processing request supports a third data exchange protocol and comprises content in the first processing request, and determining, by the first server, the second server according to the identity of the second application program, and sending the second processing request to the second server,
            wherein the step of processing, by the first server, the first processing request to obtain the second processing request, and sending the second processing request to the second server comprises:
                querying, by the first server, a database for a state mark of the second user account corresponding to the second identity; and
                processing the first processing request to obtain the second processing request and sending the second processing request to the second server when the state mark of the second user account is a pre-configured first mark; or
                storing the first processing request when the state mark of the second user account is a pre-configured second mark, and if detecting within a pre-configured time that the state mark of the second user account is modified to the first mark, processing the first processing request to obtain the second processing request and sending the second processing request to the second server.

2. The method according to claim 1, wherein the server further comprises: a third server, and wherein the step of processing, by the server, the first processing request, and sending the instant message to the second terminal according to the second identity further comprises:
    processing, by the second server, the second processing request to obtain a third processing request, and sending the third processing request to the third server, wherein the third processing request supports the second data exchange protocol and comprises the content in the first processing request; and
    sending, by the third server, the instant message to the second terminal according to the second identity.

3. The method according to claim 2, wherein the step of processing, by the server, the first processing request, and sending the instant message to the second terminal according to the second identity comprises:

sending, by the first server, the instant message to the second terminal according to the second identity.

4. The method according to claim 1, further comprising:
sending, by the first terminal, a first identity acquiring request to the server by using the first application program, wherein the first identity acquiring request comprises the first user account, and the first identity acquiring request is used for requesting all first identities associated with the first user account in the second application program to be acquired from the server;
acquiring, by the server according to the first user account in the first identity acquiring request, all the first identities associated with the first user account in the second application program, and sending all the associated first identities as a processing result to the first terminal; and
displaying, by the first terminal, all the associated first identities by using the first application program.

5. The method according to claim 4, further comprising:
receiving, by the first terminal by using the first application program, an association instruction that is triggered by the user based on the processing result, acquiring an identity at which the association instruction is directed, and displaying the identity at which the association instruction is directed as the first identity;
sending, by the first terminal, an association request to the server by using the first application program, wherein the association request comprises information about the first user account and the first identity, which are used for the server to associate the first user account with the first identity in a database; and
associating, by the server, the first user account with the first identity according to the association request, and storing an association relationship information between the first user account and the first identity in the database.

6. The method according to claim 5, further comprising:
sending, by the first terminal, a second identity acquiring request to the server by using the first application program, wherein the second identity acquiring request comprises the first identity, and the second identity acquiring request is used for requesting all associated second identities associated with the first identity in the second application program to be acquired from the server;
acquiring, by the server according to the first identity in the second identity acquiring request, all the associated second identities associated with the first identity in the second application program, and sending all the associated second identities as a processing result to the first terminal; and
displaying, by the first terminal, all the associated second identities by using the first application program.

7. The method according to claim 6, wherein the step of acquiring, by a first terminal by using a first application program, an instant message input by a user, and generating a first processing request according to the instant message comprises:
acquiring, by the first terminal, an instant message processing instruction that is triggered by the user in the first application program based on the displayed first identity and all the displayed associated second identities, acquiring the first identity, the second identity, the identity of the second application program, and the instant message at which the instant message processing instruction is directed, and generating the first processing request.

8. The method according to claim 4, further comprising:
sending, by the first terminal, a login request to the server by using the first application program, wherein the login request comprises: the first user account, a login password, and information about a network protocol address and a port; and
performing, by the server, identity authentication on the first terminal according to the login request, and marking a state of the first user account in the database with a first mark after the identity authentication on the first terminal succeeds, and storing the network protocol address and the port as connection information of the first user account in the database.

9. An instant message processing method, comprising:
receiving, by a server, a first processing request sent by a first terminal, the first processing request being generated by the first terminal according to an instant message that is input by a user and acquired by using a first application program, the first processing request being used for requesting the server to send the instant message to a second terminal, the first processing request comprising: the instant message, a first user account, a first identity, a second identity, and an identity of a second application program, wherein the first application program and the second application program each processes instant messaging on different platforms, wherein the first application program and the second application program are different application programs which support different data exchange protocols, wherein the first identity having a first association relationship information with the first user account in the second application program, the second identity having the first association relationship information with the a second user account corresponding to the second terminal in the first application program, and the second identity having a second association relationship information with the first identity in the second application program; and
processing the first processing request to transform the first processing request which support a data exchange protocol of the first application program to be a transformed processing request which support a data exchange protocol of the second application program, and sending the instant message included in the transformed processing request to the second terminal according to the second identity, so that the second terminal displays the received instant message by using the second application program, or the second terminal displays the received instant message by using the first application program and the second application program;
wherein:
the server comprises a first server and a second server,
the first application program supports a first data exchange protocol,
the second application program supports a second data exchange protocol, and
sending the instant message to the second terminal according to the second identity comprises:
processing the first processing request to obtain a second processing request, wherein the second processing request supports a third data exchange protocol and comprises content in the first processing request, and determining, by the first server, the second server according to the identity of the second application program, and sending the second processing request to the second server, wherein the step of processing, by the first server, the first processing request to obtain the second processing request, and sending the second processing request to the second server comprises:
    querying, by the first server, a database for a state mark of the second user account corresponding to the second identity; and
    processing the first processing request to obtain the second processing request and sending the second processing request to the second server when the state mark of the second user account is a pre-configured first mark; or
    storing the first processing request when the state mark of the second user account is a pre-configured second mark, and if detecting within a pre-configured time that the state mark of the second user account is modified to the first mark, processing the first processing request to obtain the second processing request and sending the second processing request to the second server.

10. The method according to claim 9, wherein the server further comprises: a third server, and wherein the step of processing the first processing request, and sending the instant message to the second terminal according to the second identity further comprises:
    processing, by the second server, the second processing request to obtain a third processing request, and sending the third processing request to the third server, wherein the third processing request supports the second data exchange protocol and comprises the content in the first processing request; and
    sending, by the third server, the instant message to the second terminal according to the second identity.

11. The method according to claim 9, further comprising:
    receiving, by the server, a first identity acquiring request from the first terminal, wherein the first identity acquiring request comprises the first user account, and the first identity acquiring request is used for requesting all first identities associated with the first user account in the second application program to be acquired from the server;
    acquiring, by the server, according to the first user account in the first identity acquiring request, all the first identities associated with the first user account in the second application program, and sending all the associated first identities as a processing result to the first terminal, so that the first terminal displays all the associated first identities by using the first application program.

12. The method according to claim 11, further comprising:
    receiving, by the server, an association request from the first terminal, wherein the association request comprises information about the first user account and the first identity, which are used for the server to associate the first user account with the first identity in a database; and
    associating, by the server, the first user account with the first identity according to the association request, and storing an association relationship information between the first user account and the first identity in the database.

13. The method according to claim 12, further comprising:
    receiving, by the server, a second identity acquiring request from the first terminal, wherein the second identity acquiring request comprises the first identity, and the second identity acquiring request is used for requesting all associated second identities associated with the first identity in the second application program to be acquired from the sever;
    acquiring, by the server according to the first identity in the second identity acquiring request, all the associated second identities associated with the first identity in the second application program, and sending all the associated second identities as a processing result to the first terminal, so that the first terminal displays all the associated second identities by using the first application program.

14. The method according to claim 11, further comprising:
    receiving, by the first server, a login request from the first terminal, wherein the login request comprises: the first user account, a login password, and information about a network protocol address and a port; and
    performing, by the sever, identity authentication on the first terminal according to the login request, and marking a state of the first user account in the database with a first mark after the identity authentication on the first terminal succeeds, and storing the network protocol address and the port as connection information of the first user account in the database.

15. An instant message processing system, comprising:
    a first terminal, a second terminal, and a server,
    wherein the server receives a first processing request sent by a first terminal, the first processing request is generated by the first terminal according to an instant message that is input by a user and acquired by using a first application program, the first processing request is used for requesting the server to send the instant message to a second terminal, the first processing request comprises: the instant message, a first user account, a first identity, a second identity and an identity of a second application program, the first application program and the second application program each processes instant messaging on different platforms, the first application program and the second application program are different application programs which support different data exchange protocols, the first identity has a first association relationship information with the first user account in the second application program, the second identity has the first association relationship information with the a second user account corresponding to the second terminal in the first application program, and the second identity has a second association relationship information with the first identity in the second application program; and
    processes the first processing request to transform the first processing request which support a data exchange protocol of the first application program to be a transformed processing request which support a data exchange protocol of the second application program, and sends the instant message included in the transformed processing request to the second terminal according to the second identity, so that the second terminal displays the received instant message by using the second application program, or the second terminal displays the received instant message by using the first application program and the second application program;
    the first terminal acquires, by using the first application program, the instant message input by the user, generates the first processing request according to the instant message, and sends the first processing request to the server; and the second terminal receives the instant message sent by the server, and displays the received instant message by using the second application program, or the second terminal displays the received instant message by using the first application program and the second application program;

wherein:

the server comprises a first server and a second server, the first application program supports a first data exchange protocol, the second application program supports a second data exchange protocol, wherein the first server processes the first processing request to obtain a second processing request, wherein the second processing request supports a third data exchange protocol and comprises content in the first processing request, and the first server determines the second server according to an identity of the second application program, and sends the second processing request to the second server, and wherein the first server queries a database for a state mark of the second user account corresponding to the second identity, and processes the first processing request to obtain the second processing request and sends the second processing request to the second server when the state mark of the second user account is a pre-configured first mark, or stores the first processing request when the state mark of the second user account is a pre-configured second mark, and if detecting within a pre-configured time that the state mark of the second user account is modified to the first mark, processes the first processing request to obtain the second processing request and sends the second processing request to the second server.

16. The system according to claim 15, wherein the server further comprises: wherein the second server processes the second processing request to obtain a third processing request, and sends the third processing request to the third server, wherein the third processing request supports the second data exchange protocol and comprises the content in the first processing request; and the third server sends the instant message to the second terminal according to a second identity.

17. The system according to claim 16, wherein the first server sends the instant message to the second terminal according to the second identity.

* * * * *